H. R. VAN DEVENTER.
IGNITER MECHANISM FOR INTERNAL COMBUSTION ENGINES.
APPLICATION FILED APR. 13, 1916.
Reissued May 16, 1916. 14,134.
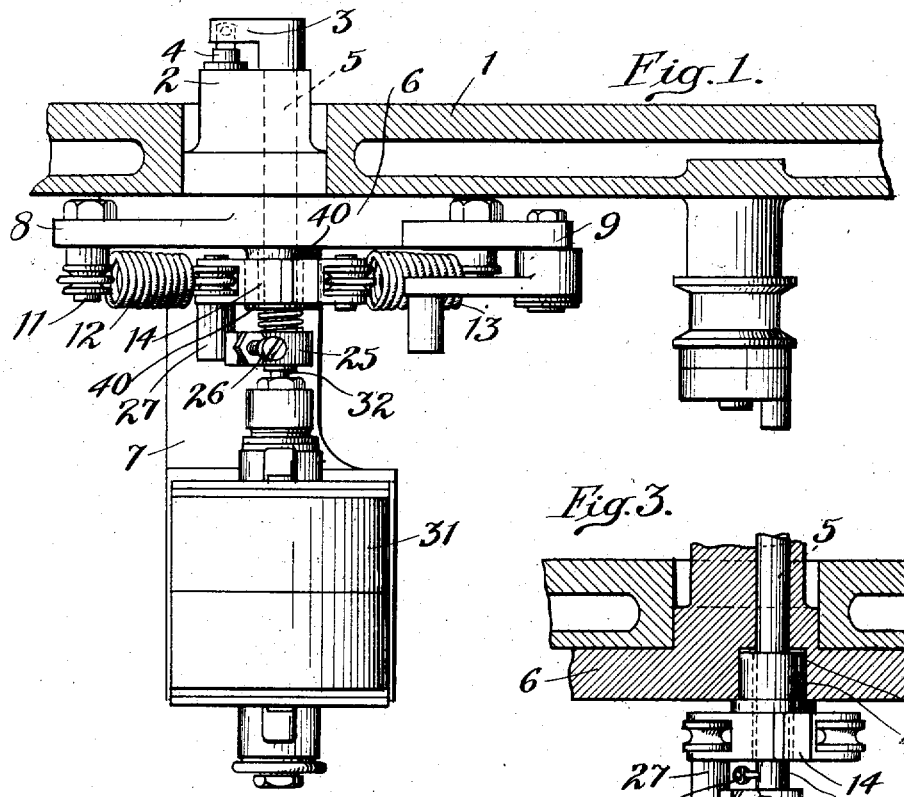
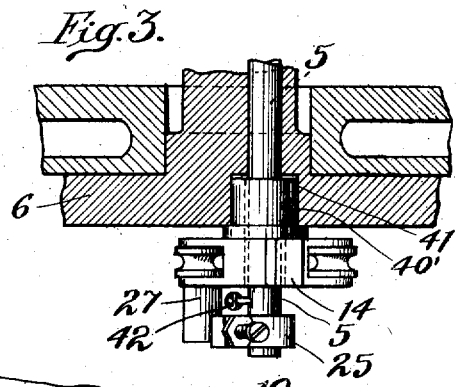
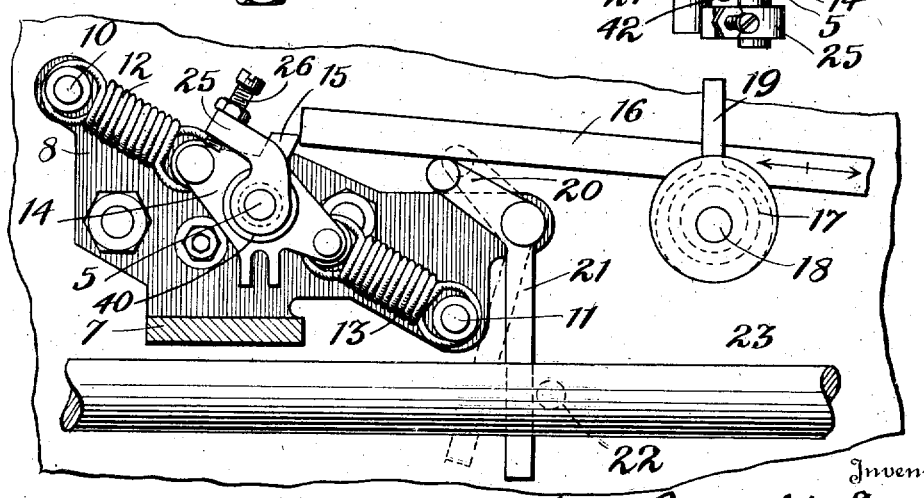
Fig. 2.
Witnesses
H. H. Swarstein
James H. Marr
Inventor
Henry Randolph Van Deventer
By Edward E. Clement
Attorney

UNITED STATES PATENT OFFICE.

HARRY RANDOLPH VAN DEVENTER, OF SUMTER, SOUTH CAROLINA, ASSIGNOR, BY MESNE ASSIGNMENTS, TO SPLITDORF ELECTRICAL COMPANY, OF NEWARK, NEW JERSEY, A CORPORATION OF NEW JERSEY.

IGNITER MECHANISM FOR INTERNAL-COMBUSTION ENGINES.

14,134. Specification of Reissued Letters Patent. Reissued May 16, 1916.

Original No. 1,176,502, dated March 21, 1916. Serial No. 878,933. Application for reissue filed April 13, 1916. Serial No. 91,581.

*To all whom it may concern:*

Be it known that I, HARRY RANDOLPH VAN DEVENTER, a citizen of the United States, residing at Sumter, in the county of Sumter and State of South Carolina, have invented certain new and useful Improvements in Igniter Mechanism for Internal-Combustion Engines, of which the following is a specification, reference being had to the accompanying drawing.

My invention relates to ignition apparatus for internal combustion engines and has for its purpose the provision of a compact and efficient ignition unit, self-contained and mounted upon or in close association with the igniter proper of the engine.

Briefly stated the invention comprises a frame adapted to be mounted on or near the engine cylinder and carrying an igniter which is so positioned as to project into the ignition chamber of the engine when the frame is mounted. The frame also carries bearing surfaces, one within the other, for the igniter operating shaft and trip lever respectively, these bearings being carried by the frame independently of each other. The advantage of this arrangement of the bearings is that the lateral and axial strains put upon the trip lever by the operating forces are confined to it. The frame also carries a bracket on which the magneto is supported as well as extensions or arms with projecting posts for mounting the various operating parts. The trip lever and the operating shafts of the magneto and igniter are so positioned in relation to each other that a pure tangential or rotary motion only is transmitted from the operating lever to the different shafts, the various strains tending to produce other motion being confined to the trip lever.

Various means may be made use of for operating the trip lever and other parts, a specific means being shown and described in the accompanying specification by way of example.

My invention is illustrated in the accompanying drawings in which:—

Figure 1 is a plan view of my ignition unit applied to the cylinder wall shown in section. Fig. 2 is a front elevation of the same with the magneto removed. Fig. 3 is a fragmentary view similar to Fig. 1 but of a modified form.

In the drawings, 1 indicates a wall of the engine cylinder, which may be of any standard or desired type to which this general type of ignition apparatus is applicable.

2 indicates the body of an igniter which enters the cylinder through an opening in the wall 1.

3 indicates the movable electrode of the igniter coöperating with a fixed electrode 4 carried on the body. The electrode 3 is mounted on a shaft 5 which extends through the body 2, for operation by mechanism external to the cylinder.

Secured to the body 2 is a bracket 7 projecting from the engine cylinder in a plane parallel to the axis of the igniter, and preferably horizontal. Integral with this bracket, and also with the igniter body 2, is a plate or flange 6 carrying arms 8 and 9 upon which are mounted posts or studs 10 and 11, serving as fixed anchorages for the outer ends of the operating springs 12 and 13. A hollow stub shaft 40 projects outwardly from the flange 6 and surrounds the ignited shaft 5. Mounted upon this stub shaft 40, and adapted to oscillate freely thereon is an actuator or trip lever 14 with an upwardly projecting finger 15 in the path of reciprocating travel of a push rod 16 which when the engine is running is moved back and forth as indicated by the double headed arrow in Fig. 2. This reciprocating motion may be imparted to the push rod by a crank or cam or other device driven by the engine in a manner which will be well understood by those skilled in the art. The engagement of the parts 15 and 16 is adapted to be controlled by two other independent elements, the first being an eccentric 17 mounted on a fixed shaft 18 and rotatable by means of a handle 19; and the second element being the bell crank lever 20—21, whose arm 20 lifts the push rod 16 so that it cannot engage the finger 15, when the arm 21 is forced to the left as indicated in dotted lines in Fig. 2, by a pin or stud 22 on the exhaust valve operating rod 23. The function of the eccentric cam 17 is to effect timing of the spark by determining the extent of engagement of the end of the push rod 16 with the finger 15, and thereby the exact point in the stroke of the push rod at which it will slip over the point of the finger 15 and permit the actuator to be snapped back by the springs. The function of the bell crank lever 20—21 is to disengage the push rod entirely and prevent actuation of the trip lever 14 on the exhaust stroke. This of course is particularly applicable to a "hit-and-miss" engine.

The electrodes 3 and 4 are normally maintained in engagement by means of a helical spring 24 (see Fig. 1) having one end attached to the flange or frame 6 and the other end attached to the electrode shaft 5. The opening of the electrodes is accomplished by means of a dog 25 rigidly fixed on the electrode shaft and carrying a screw tappet 26, engaged from beneath by a stud 27 carried on the actuator or trip lever 14. This stud serves also for the attachment of the spring 12, each end of the actuator being slotted to receive the eye on the end of a spring. A pin 28 at the opposite end of the actuator 14 from the stud 27 receives and holds the eye on the end of the spring 13, and the parts are so proportioned that when the actuator is in the position shown in Fig. 2, that is to say in the normal non-firing position, its axis will approximately coincide with the axes of the spring helices, the springs being under sufficient tension to maintain this position.

Outside of the actuator, a magneto machine 31 is mounted on the bracket 7, this machine being shown in plan in Fig. 1, but being removed in Fig. 2 and the bracket shown in section, in order to expose the operating parts. This magneto, as already stated, may be of any stated type or structure provided it has a rotor or oscillator capable of producing a spark as required by the igniter. I do not herein claim any specific means for attaching the rotor or oscillator of this magneto to the other parts, and particularly to the actuator, but I have indicated a connection at 32 in Fig. 1 between the shaft of the magneto and the actuator 14, which it will be remembered is free to oscillate on the shaft 40 surrounding the shaft 5. The connection thus indicated may be by means of screws, or a combination collar, or any desired type of coupling or connection, many devices suitable for this purpose being well known in the art, and one of them, a detachable pin and slot crank coupling being described and illustrated in my prior application Serial No. 878,196, filed December 19, 1914.

Referring to the modification shown in Fig. 3 the bearing of the trip lever is in the form of a short post or stub bearing 40′ carried by the trip lever and coöperating with a bore 41 in the flange 6, the stub shaft being locked in the bore in any well known manner, which is not here shown. The igniter operating shaft 5 extends through a bore in the stub shaft 40′ and is supported in a bore in the igniter body independently of the stub shaft. Another point of difference in this modified form is that the tension means for holding the igniter shaft at normal is in the form of a pull spring 42 connected between a pin in the igniter shaft at any suitable fixed point on the frame of the ignition unit. It is obvious that the spring 42 may be substituted by any other tension means tending to hold the igniter shaft in normal position.

It will be noticed that in both forms here shown the bearings for the igniter shaft and trip lever while substantially in alinement and one within the other, are independently supported by the frame, whereby only a tangential or rotary motion is transmitted from the trip lever to the different operating shafts and all lateral and axial strains produced by the operating forces are confined to the trip lever.

While I have set forth herein a preferred specific form of my invention, it is to be understood that I do not limit myself to such a specific form but contemplate all other modifications as fall within the scope of the appended claims.

Having thus described my invention, what I claim and desire to secure by Letters Patent is:

1. An ignition mechanism for internal combustion engines comprising a frame, an igniter and a magneto carried by said frame, an operating shaft for each of said igniter and magneto, a bearing for the igniter shaft, a bearing carried by said frame surrounding the said igniter shaft bearing, a trip lever carried by said bearing independently of the igniter shaft and means for transmitting motion from the trip lever to both of said igniter and magneto shafts.

2. An ignition mechanism for internal combustion engines comprising a frame, an igniter and a magneto carried by said frame, an operating shaft for each of said igniter and magneto, a hollow stub shaft carried by the frame independently of said other shafts and surrounding said igniter operating shaft, a trip lever loosely mounted on the stub shaft and means for transmitting motion from said trip lever to both of said igniter and magneto shafts.

3. An ignition mechanism for internal combustion engines comprising a frame, an igniter and a magneto carried by said frame, an operating shaft for each of said igniter and magneto, a bearing for the igniter shaft, a bearing carried by said frame surrounding the said igniter shaft bearing, a trip lever carried by said bearing independently of the igniter shaft, means for transmitting the entire rotary movement of the trip lever to the magneto shaft and other means for transmitting a portion of said rotary movement to the igniter shaft.

4. An ignition mechanism for internal combustion engines comprising a frame, an igniter and a magneto carried by said frame, an operating shaft for each of said igniter and magneto, a bearing for the igniter shaft, a bearing carried by said frame surrounding the said igniter shaft bearing, a trip lever carried by said bearing independently of the igniter shaft, tension means tending normally to hold the trip lever in a given position, other tension means tending normally to hold the igniter shaft in a given position, means for rotating said trip lever through a predetermined angular distance against the force of its associated tension means and then trip or release the lever which suddenly returns to the said given position under force of its tension means and means for transmitting motion from the trip lever to both of said igniter and magneto shafts.

5. An ignition mechanism for internal combustion engines comprising a frame, an igniter and a magneto carried by said frame, a trip lever, a bearing for each of said igniter shaft and trip lever carried by the frame independent of and concentric to each other and means for transmitting motion from the trip lever to both of said igniter and magneto shafts.

6. An ignition mechanism for internal combustion engines comprising a frame adapted to be mounted on an engine, an igniter body carried by the frame in such manner as to be positioned within the ignition chamber of the engine, outer and inner circular bearing surfaces carried by said frame, the elements of said inner bearing surface being all within the elements of said outer bearing surface, a bracket carried by the frame extending oppositely from the igniter body, arms carried by the frame extending laterally of said bearings, a plurality of posts carried by said arms and extending therefrom opposite of the igniter body, a magneto mounted on the bracket with its operating shaft substantially in alinement with the said bearings, an igniter device carried by the igniter body and positioned within the fi ng chamber of the engine, an operating shaft for the igniter device carried by the inner one of said bearings, a trip lever carried by the outer one of said bearings independently of the igniter operating shaft, tension means connecting the trip lever with certain of said posts and tending normally to hold the trip lever in a given position, means operating in unison with the operation of the engine for rotating the trip lever against the force of the tension means and releasing it to be suddenly returned to the said given position by the force of the tension means and means for transmitting motion from the trip lever to both the magneto operating shaft and the igniter operating shaft.

In testimony whereof I hereunto affix my signature in the presence of two witnesses.

HARRY RANDOLPH VAN DEVENTER.

Witnesses:

EDNA B. ISLER,

E. H. RHAME.

Copies of this patent may be obtained for five cents each, by addressing the "Commissioner of Patents, Washington, D. C."